(12) United States Patent
Masse et al.

(10) Patent No.: US 9,989,096 B2
(45) Date of Patent: Jun. 5, 2018

(54) SELF-LUBRICATING ARTICULATION ELEMENT MADE FROM A COMPOSITE MATERIAL AND OPERATING UNDER HIGH DYNAMIC LOADINGS

(71) Applicant: H.E.F., Andrezieux Boutheon (FR)

(72) Inventors: Emmanuel Masse, Feurs (FR); Olivier Blandenet, Meylan (FR); Philippe Maurin-Perrier, Saint Marcellin en Forez (FR)

(73) Assignee: H.E.F., Andrezieux Boutheon (FR)

( * ) Notice: Subject to any disclaimer, the term of this patent is extended or adjusted under 35 U.S.C. 154(b) by 540 days.

(21) Appl. No.: 14/436,693

(22) PCT Filed: Oct. 15, 2013

(86) PCT No.: PCT/FR2013/052459
§ 371 (c)(1),
(2) Date: Apr. 17, 2015

(87) PCT Pub. No.: WO2014/064367
PCT Pub. Date: May 1, 2014

(65) Prior Publication Data
US 2016/0061267 A1    Mar. 3, 2016

(30) Foreign Application Priority Data

Oct. 22, 2012 (FR) ...................... 12 60033

(51) Int. Cl.
*F16C 41/00* (2006.01)
*F16C 33/20* (2006.01)
(Continued)

(52) U.S. Cl.
CPC ........... *F16C 41/00* (2013.01); *C10M 103/02* (2013.01); *C10M 103/06* (2013.01);
(Continued)

(58) Field of Classification Search
CPC .............. C10M 103/02; C10M 103/06; C10M 107/38; F16C 33/201; F16C 33/208; F16C 33/28
See application file for complete search history.

(56) References Cited

U.S. PATENT DOCUMENTS 2,835,539 A * 5/1958 Conrad ................. F16C 33/201
                                                  16/96 R
3,692,375 A * 9/1972 Matt ....................... B29C 53/60
                                                  138/144
(Continued)

FOREIGN PATENT DOCUMENTS

FR       2117062 A5    7/1972
WO       7900752 A1   10/1979
WO    2006037083 A2    4/2006

OTHER PUBLICATIONS

International Search Report for PCT/FR2013/052459 dated Dec. 5, 2013.

*Primary Examiner* — Daniel J Wiley
(74) *Attorney, Agent, or Firm* — Heslin Rothenberg Farley & Mesiti P.C.

(57) ABSTRACT

The element is formed from the winding of a fabric of small thickness ranging between 20 μm and 150 μm and mixed with a resin containing fillers. The fabric has the form of strips having a width ranging between 5 mm and 200 mm, with the strips being crossed in several layers.

10 Claims, 4 Drawing Sheets

(51) Int. Cl.
*F16C 33/28* (2006.01)
*C10M 103/02* (2006.01)
*C10M 103/06* (2006.01)
*C10M 107/38* (2006.01)
*F16C 11/04* (2006.01)
*F16C 17/02* (2006.01)
*F16C 23/02* (2006.01)

(52) U.S. Cl.
CPC ......... *C10M 107/38* (2013.01); *F16C 33/201* (2013.01); *F16C 33/208* (2013.01); *F16C 33/28* (2013.01); *C10M 2201/0413* (2013.01); *C10M 2201/0663* (2013.01); *C10M 2213/0623* (2013.01); *F16C 11/04* (2013.01); *F16C 17/02* (2013.01); *F16C 23/02* (2013.01); *F16C 33/203* (2013.01); *F16C 2208/02* (2013.01); *F16C 2208/40* (2013.01); *F16C 2208/70* (2013.01); *F16C 2208/86* (2013.01); *F16C 2208/90* (2013.01); *F16C 2240/30* (2013.01); *F16C 2240/60* (2013.01)

(56) References Cited

U.S. PATENT DOCUMENTS

| | | | | |
|---|---|---|---|---|
| 4,137,618 | A * | 2/1979 | Krauss | F16C 11/0633 156/245 |
| 5,431,500 | A * | 7/1995 | Harris | B29C 53/586 384/206 |
| 8,231,276 | B2 * | 7/2012 | Than Trong | F16C 33/201 29/898.041 |
| 9,790,984 | B2 * | 10/2017 | Masse | F16C 23/045 |
| 2004/0074592 | A1 * | 4/2004 | Ashton | B29C 37/0064 156/175 |
| 2017/0175812 | A1 * | 6/2017 | Masse | F16C 33/208 |

* cited by examiner

Rotation

CROSSING ANGLE 3 300-μm plies

BEFORE 9 100-μm plies

AFTER

SELF-LUBRICATING ARTICULATION ELEMENT MADE FROM A COMPOSITE MATERIAL AND OPERATING UNDER HIGH DYNAMIC LOADINGS

CROSS REFERENCE TO RELATED APPLICATIONS

This application is the U.S. National Filing of PCT Application No. PCT/FR2013/052459 filed on Oct. 15, 2013 and published in French as WO 2014/064367 A1 on May 1, 2014, and claims priority of French patent application number 1260033 filed on Oct. 22, 2012, the entire disclosure of these applications being hereby incorporated herein by reference.

BACKGROUND ART

The invention relates to the technical field of self-lubricating joints.

The invention advantageously applies for all types of joints requiring a greaseless operation, that is, with a self-lubricating operation and operating under high loads in dynamic state.

The invention aims at obtaining a self-lubricating joint made of polymer which is homogeneous across its entire thickness with no reinforcement substrate and operating under high loads, for example, greater than 60 MPa in dynamic state.

According to the state of the art, this type of composite polymer joint is not fully satisfactory due to its poor load behavior and to the risks of flow and delamination under a dynamic load, including for loads lower than 60 MPa. For example, according to the state of the art, the joint element may be obtained from a winding of a synthetic fabric mixed with a thermosetting or thermoplastic resin of epoxy, polyester, or other type, the fabric thickness being on the order of 300 μm. The fabric appears in the form of strips formed in several layers to obtain the desired thickness, for example, 3 layers.

The invention aims at overcoming these disadvantages in a simple, reliable, efficient, and rational way.

The problem that the invention aims at solving is to obtain a polymer-type joint capable of operating under high dynamic loads, greater than 60 MPa.

BRIEF SUMMARY OF THE INVENTION

According to the invention, the joint element is formed from the winding of a fabric of small thickness ranging between 20 μm and 150 μm and preferably between 20 μm and 130 μm and mixed with a resin comprising fillers, said fabric appearing in the form of strips having a width ranging between 5 mm and 200 mm, said strips being crossed in several layers, according to the filament winding technique.

Such features provide a better homogeneity with the use of thinner strips and a better resistance to tangential frictional stress due to the crossing of the layers of fabric forming the material.

This also results in a better dynamic load behavior due to the crossing of the strips and a better static load behavior due to a better homogeneity of the material.

Advantageously, the crossing angle ranges between 10° and 90°, and preferably between 30° and 86°.

According to other features, the resin is of epoxy, ester vinyl, polyester, phenolic, polyimide, or other type while the fillers are of PTFE, MoS2, or graphite type.

It should be noted that the fillers amount to between 5 and 70% of the volume.

BRIEF DESCRIPTION OF THE DRAWING FIGURES

The invention is discussed hereafter in further detail by means of the accompanying drawings, among which:

DETAILED DESCRIPTION

According to the invention, the self-lubricating joint element (1), such as a ring, for example, is made from the winding of a synthetic fabric of small thickness (T4) ranging between 20 μm and 150 μm and advantageously between 20 μm and 130 μm.

The fabric, which appears in the form of strips (4), is mixed with a resin (2) of epoxy, ester vinyl, polyester, phenolic, polyimide, or other type.

This resin (2) comprises fillers (3) of PTFE, MoS2, graphite or other types, by on the order of from 5 to 70% of the volume. The aim is to obtain a product which is homogeneous across its entire thickness.

The fabric strips (4) have a width (W4) ranging between 5 mm and 200 mm and are wound on a mandrel of determined diameter, according to the filament winding technique.

The strips (4) are wound and crossed in several layers, the crossing angle (A4) ranging between 10° and 90° and advantageously between 30° and 86°.

Figure 1:
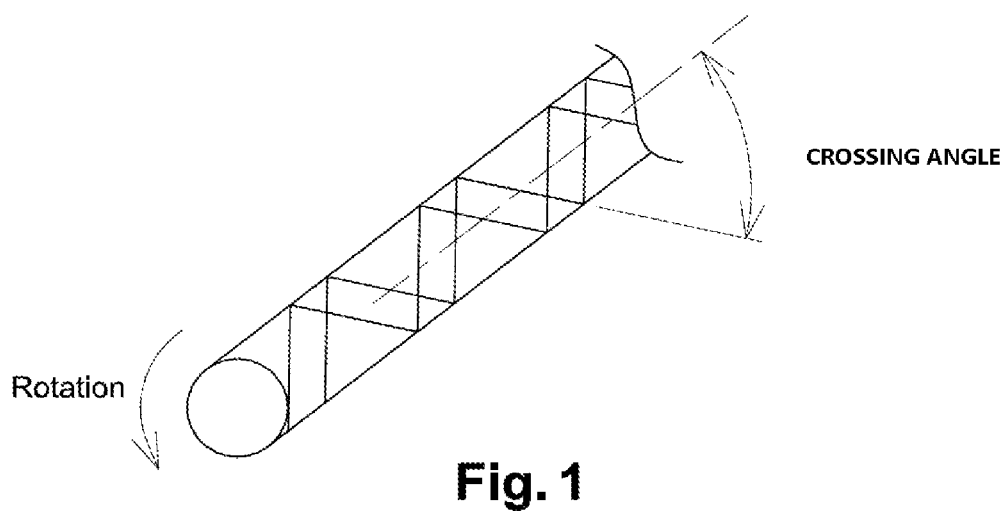
FIG. 1 shows the winding of a fabric of small thickness according to the features of the invention.
Figure 2:
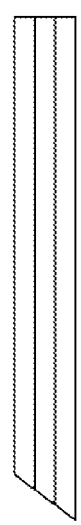
FIG. 2 is a very simplified view showing the fabric winding according to the prior state of the art to obtain a determined thickness.
Figure 3:
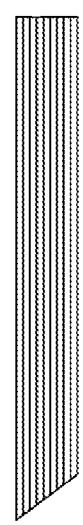
FIG. 3 is a view similar to FIG. 2 showing the fabric winding according to the invention to obtain the same determined thickness.
Figure 4:
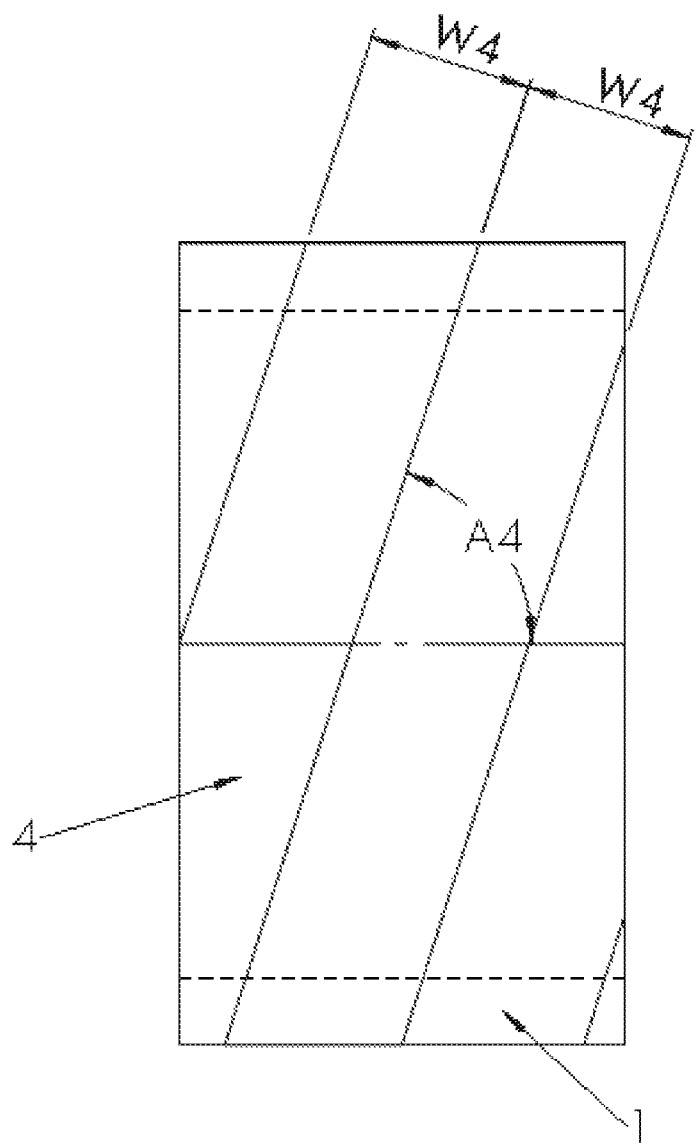
FIG. 4 is a partial side view of wound strips of a self-lubricating joint element according to the invention.
Figure 5:
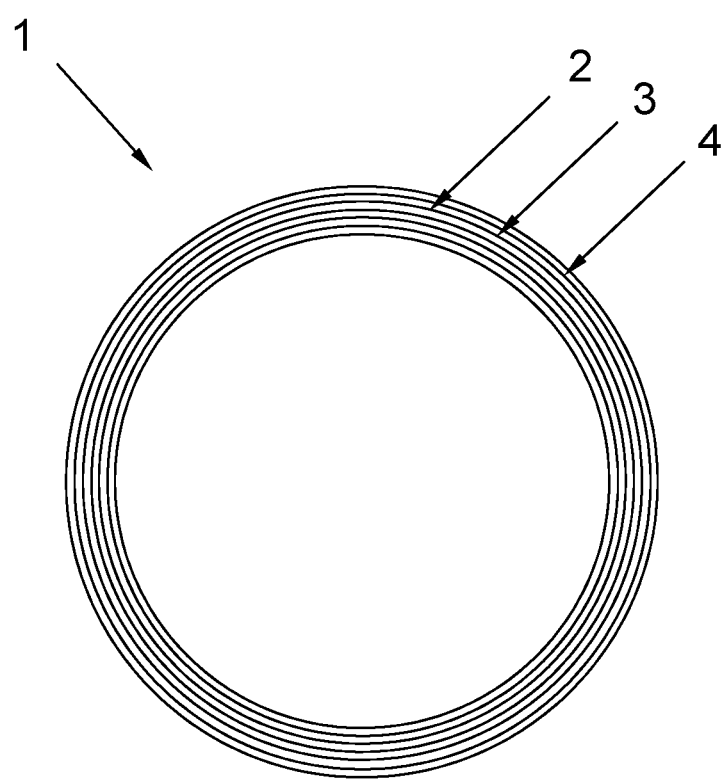
FIG. 5 is a sectional view of a ring-shaped self-lubricating joint element of the present invention.
Figure 6:
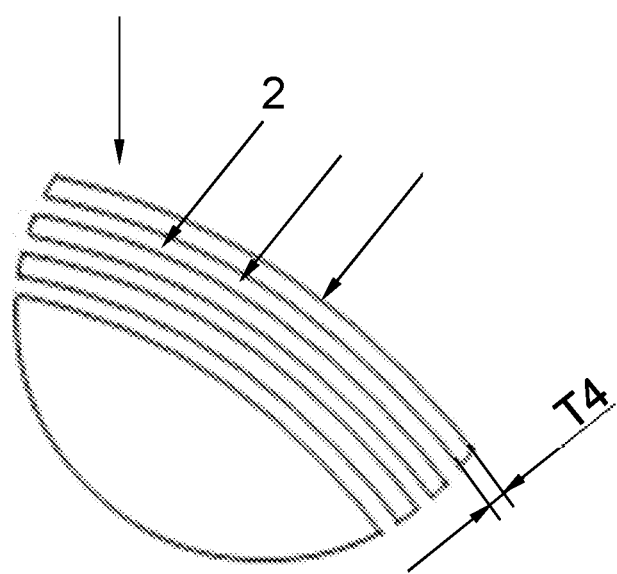
FIG. 6 is an enlarged view of a circumferential section of the ring-shaped joint element according to the present invention.

Reference should be made to FIG. 3, which shows a winding in the form of 9 plies of 100 μm as opposed to a winding according to the state of the art in the form of 3 plies of 300 μm.

It should be noted that the fabric intended to be mixed with the resin may be made of taffeta, satin, twill or a cloth, without excluding other fiber textures.

Reference should be made to the following tests in the case of a joint in the form of a self-lubricating composite ring receiving an axis of characteristic 16 NC 6 CT Ra: 04.

Shaft diameter: 30 mm
Width of the guide member: 20 mm
Motion: alternated rotation over 90°
Pressure calculated in projected area: 80 MPa
Sliding speed: 8 mm/s
Friction coefficient>0.25
The tests have the following results:
Prior State of the Art
Winding at 90°
Width of the fabric strip used: 1,200 mm
Fabric thickness: 0.30 mm
Outer diameter of the ring to be obtained: 36 mm Obtained wear>0.5 mm
Friction coefficient<0.2 mm
Number of cycles: 30,000.
According the Features of the Invention:
Crossed winding
Width of the fabric strip used: 30 mm
Fabric thickness: 0.10 mm
Outer diameter of the ring to be obtained: 36 mm
Obtained wear: 0.4 mm
Friction coefficient<0.1 mm
Number of cycles: 365,000.

The invention claimed is:

1. A self-lubricating joint element adapted to operate under high dynamic loads, comprising:
a resin comprising fillers, and
a plurality of superimposed strips of fabric mixed with the resin, such that the joint element is homogeneous across an entire thickness of the joint element,
each strip having a thickness ranging between 20 µm and 150 µm, and a width ranging between 5 mm and 200 mm, said strips being crossed in several layers by filament winding with respect to adjacent strips.

2. The element of claim 1, wherein each strip has a thickness ranging between 20 µm and 130 µm.

3. The element of claim 1, wherein a crossing angle of the crossed strips ranges between 10° and 90°.

4. The element of claim 1, wherein a crossing angle of the crossed strips ranges between 30° and 86°.

5. The element of claim 1, wherein the fabric comprises a synthetic fabric.

6. The element of claim 1, wherein the resin comprises epoxy, ester vinyl, polyester, phenolic, or polyimide.

7. The element of claim 1, wherein the fillers comprise PTFE, MoS2, or graphite.

8. The element of claim 7, wherein the fillers amount to between 5 and 70% of the volume.

9. The self-lubricating joint element of claim 1, wherein the joint element is ring-shaped.

10. The self-lubricating joint element of claim 1, wherein the joint element is capable of operating under dynamic loads greater than 60 MPa.

* * * * *